United States Patent

[11] 3,567,920

| [72] | Inventor | Richard D. Campbell<br>Harmarville, Pa. |
|---|---|---|
| [21] | Appl. No. | 707,362 |
| [22] | Filed | Feb. 6, 1968 |
| [45] | Patented | Mar. 2, 1971 |
| [73] | Assignee | Westinghouse Air Brake Company<br>Swissoale, Pa. |

[54] PROXIMITY DETECTOR
13 Claims, 2 Drawing Figs.

[52] U.S. Cl............................................... 246/249,
340/38, 340/258
[51] Int. Cl............................................... B61l 1/08
[50] Field of Search.................................... 246/249;
340/258 (C), 38 (L), 210; 328/5; 317/146; 340/18

[56] References Cited
UNITED STATES PATENTS
2,210,205 8/1940 Elliott........................... 340/18X

| 2,966,582 | 12/1960 | Wachtel........................ | 246/249 |
| 2,974,303 | 3/1961 | Dixon............................ | 340/210UX |
| 3,086,109 | 4/1963 | Kaehms......................... | 246/249 |
| 3,201,774 | 8/1965 | Uemura......................... | 340/258(C) |
| 3,335,291 | 8/1967 | Gutzwillen .................... | 307/252 |

Primary Examiner—Arthur L. LaPoint
Assistant Examiner—George H. Libman
Attorneys—W. L. Stout and John B. Sotak ABSTRACT: An electronic proximity detector for detecting a vehicle wheel traversing a track rail having a rail-mounted oscillating, amplifying and switching unit and a remotely located power and utilization unit electrically interconnected by an interface circuit having a rectifier network and a pair of electrical conductors for constantly supplying operating power to the rail-mounted unit and for operably providing an output signal to the remotely located unit during the presence of a vehicle wheel.

PATENTED MAR 2 1971

3,567,920

PROXIMITY DETECTOR

My invention relates to an electronic proximity detector and more particularly to a solid-state detection circuit for indicating the presence and passage of objects moving along a given path of travel.

While many electronic devices for detecting the presence and passage of objects moving along a predetermined path are already known, these former contrivances are possessed with various shortcomings which limit their usage only to ideally controlled environmental surroundings. However, in railroading applications, the detection apparatus must be capable of satisfactorily withstanding extreme vibrations or traumatic shock, varying climatic conditions, drastic electrical variations and rigorous physical abuse. For example, in railroad classification yards, the detecting apparatus may be used in conjunction with switching operations to insure that the switch points are not thrown under a car, i.e., that the switch machine is incapable of being energized until the last wheel of a car or cut-of-cars has completely cleared the switch in order to prevent cornering. Similarly, the detecting apparatus may equally well be employed in other railroad functions, such as, a vehicle detection arrangement for determining the distance-to-go of a train approaching a station platform wherein it is desired to automatically initiate precision stopping control equipment. It will be appreciated, that in each of these applications as well as others, the detecting apparatus not only must meet the rigors of a railroad milieu but also must satisfy the required needs in a simple and economical yet reliable manner. Further, a deficiency of many railroad installations is the lack or availability of a suitable electrical supply source at a given wayside location for supplying power to the electronic wayside apparatus. Previously, battery supply sources were generally used to provide the necessary electrical operating potential for the electronic wayside equipment. However, batteries are not entirely satisfactory since they are relatively short-lived and unreliable during extremely low ambient temperatures and also require frequent attention and replacement under heavy usage. Similarly, other electronic detecting schemes employed AC to DC wayside conversion units. However, these conversion units do not completely fulfill the railroad needs since converters are generally bulky and, therefore, do not lend themselves to being rail-mounted. Further, the addition of a converter normally requires a supplemental wayside housing or enclosure which is inconvenient as well as costly, from the standpoint of initial installation and subsequent maintenance. Also, in some cases, commercial power is not readily available at the wayside location, and, therefore, power lines must be strung and installed for supplying necessary alternating current voltage to the converter itself. It will be appreciated that the avoidance of wayside power supplies i.e. batteries and converters, readily permits the entire detecting apparatus located at the wayside to be rail-mounted so that a more stable, maintenance-free and reliable detecting arrangement may be realized.

Accordingly, it is an object of my invention to provide a new and improved proximity detector arrangement for detecting the passage of moving objects which overcomes the above-mentioned disadvantages.

A further object of my invention is to provide a unique railroad wheel detector having a rail-mounted unit which is supplied with operating potential from a remote location and provides an output signal at the remote location over a single pair of line wires.

Another object of my invention is to provide an improved wheel detector arrangement for indicating the passage of a wheel moving along a track rail having a rail-mounted solid-state detection unit which is powered from a remote location.

Yet another object of my invention is to provide an improved transistorized presence detector for detecting the presence of an object moving along a predetermined path by employing a detection unit positioned at a preselected point along the predetermined path which is responsive to the presence of the moving object for controlling the electrical condition of a remotely located unit, with both units being supplied by a common source of power.

Still yet another object of my invention is to provide an improved wheel detector wheel detector which will only provide a single output indication per passing wheel.

Still another object of my invention is to provide an improved proximity detector for sensing the presence of railway vehicle wheels traversing a track rail having a rail-mounted unit and a remotely located unit electrically interconnected by a two-wire conductor.

Still yet a further object of my invention is to provide a new and improved railroad wheel detector which is protected against vibrational and electrical transients and is unaffected by climatic and physical disturbances.

A still further object of my invention is to provide a unique proximity detector which is simple in design, economical to manufacture, efficient in operation and endurable in use.

Briefly stated, my invention comprises a vehicle wheel proximity detector having a rail-mounted electronic unit, a remotely located unit and an interface circuit electrically interconnecting the rail-mounted electronic unit with the remotely located unit. In a preferred embodiment of the invention, the rail-mounted electronic unit comprises a transistorized oscillator, an amplifier and a switching circuit. The oscillator circuit normally produces a signal having a predetermined frequency and a given amplitude during the absence of a train wheel. The oscillator output signal is applied to the amplifier circuit, and the amplified output prevents the switching circuit from conducting at this time. The remotely located unit includes a source of power and a utilization device. The interface circuit includes a rectifier network and a two-wire conductor for continuously supplying operating potential to the rail-mounted electronic unit. During the presence or passage of each railroad vehicle wheel, the oscillator signal frequency changes and its amplitude decreases so that an output is no longer available for holding the switching circuit nonconductive. With the removal of the amplified output, the switching circuit becomes conductive and establishes an energizing circuit path from the source of power over the two-wire conductor through the rectifier network to the utilization device for signifying the presence of the vehicle wheel. After a predetermined time or after the passage of the vehicle wheel, the oscillator resumes its normal oscillating condition so that the amplifier again produces an amplified output, the switching circuit reverts to its nonconductive condition and deenergizes the utilization device.

The foregoing objects and other attendant features and advantages will become more readily appreciated and the subject matter of the invention better understood by reference of the following description when considered in conjunction with the accompanying drawings wherein.

Figure 1:
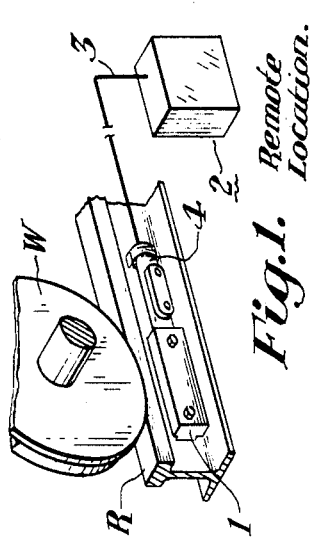
FIG. 1 is a diagrammatic representation of the invention as utilized in a railroad application for detecting the presence or passage of vehicle wheels.

Referring now to the drawings and in particular to FIG. 1, there is shown a track rail R over which moving objects such as, wheel W of a railway vehicle, travel. As shown, the proximity detector includes a wayside detection unit 1 and a remotely located unit 2 electrically interconnected by a suitable conductor or cable 3. Preferably the wayside detecting apparatus 1 is embedded in a suitable plastic compound such as, a polyurethane casing, which not only provides a hermetic seal to protect the various components from moisture and foreign particles, but also materially reduces the effects of external shock and vibrations on the internally supported components. The detection unit 1 is secured to the web of the rail R on the gauge side of the track by suitable fastening means, such as, a pair of through bolts. A conduit 4 is provided at one end of the housing for accommodating the detection unit leads and for facilitating the necessary electrical connection with the cable 3. As previously mentioned, the remotely located unit 2 includes the necessary power supply which provides the necessary operating potential to the wayside detection unit 1 over cable 3 which consists of a single pair of wire. As will be described in detail hereinafter, the conductor 3 not only furnishes the necessary DC supply voltage for the various circuits of the detection unit 1, but also permits the flow of current for producing an output signal which is indicative of the presence and passage of a railway vehicle wheel. The remote unit 2 may be conveniently situated at any suitable location, such as, the yard master's office or the central control office, where the passage of train wheel information may be appropriately utilized by wheel counting logic or train control apparatus. In actual practice, a distance of a thousand (1,000) feet has been attained between the rail-mounted detection unit 1 and the remotely located unit 2 by simply using a pair of 014 AWG twisted wires. It will be appreciated that increased distances may obviously be achieved by employing larger sizes of wires for conductor 3.

Figure 2:
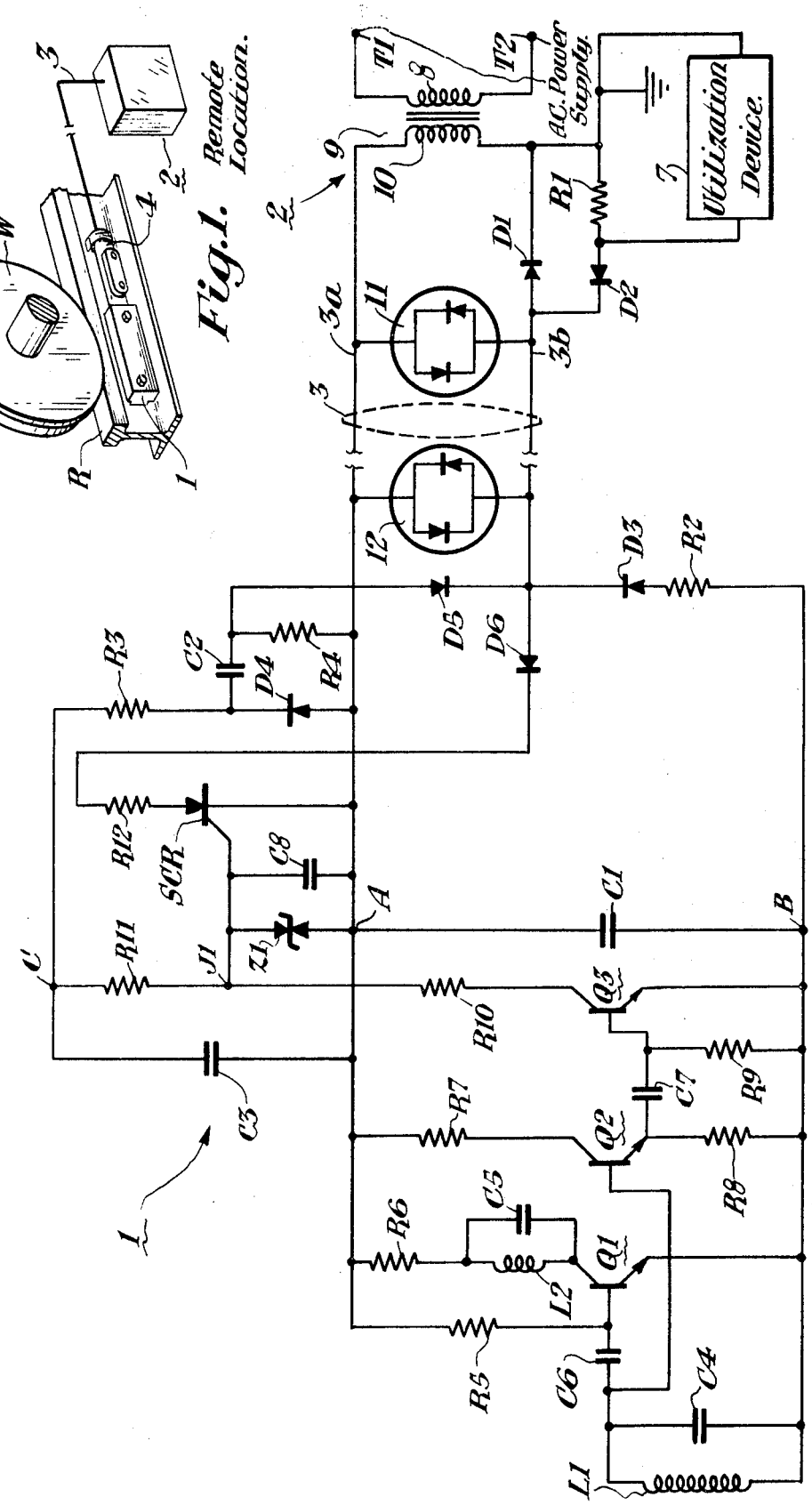
FIG. 2 is a diagrammatic circuit diagram showing the various details of the invention shown and employed in FIG. 1.

Referring now to FIG. 2 of the drawings, the various circuit details and components employed in practicing the present invention are shown. As noted, the rail-mounted detection unit 1 comprises an oscillator circuit, a two-stage amplifier circuit, and a switching circuit. As previously mentioned, the various components and elements of each of the circuits are completely encapsulated and suitably mounted to the web portion of the rail R, as shown in FIG. 1. The remotely located unit 2 includes a suitable source of alternating current voltage to which terminals T1 and T2 may be connected. An appropriate utilization device 7, such as, an electromagnetic or static relay is adapted to cooperate with suitable wheel counter logic in yard applications or with suitable distance-to-go signal apparatus in train stopping operations. As shown, the input terminals T1 and T2 are connected to the respective ends of the primary winding 8 of a power transformer 9 having a secondary winding 10. Thus, the secondary winding 10 furnishes the necessary magnitude of operating potential for the solid-state wayside detection unit 1 and also provides the necessary supply voltage for operating the utilization device 7, as will be described in greater detail hereinafter.

It has been found that this dual function of providing DC operating potential to the wayside detection unit and supplying suitable supply voltage for the utilization device is particularly useful in older classification yards where, in many cases, only a spare pair of wires may be available along the side of the railroad track. However, in new installations, a single two-wire interconnection is also desirable and advantageous from the standpoint of cost reduction in eliminating the necessity of providing a multitude of interconnecting line wires as well as removing the need of possibly installing conventional transmission lines. Accordingly, an improved arrangement is realized in the present invention by interconnecting the secondary winding 10 of transformer 9 to the two-wire conductor 3 through an interface unit or circuit. The unique interface circuit permits the feeding of operating potential to the wayside detection unit 1 and also enables a signal to be received back at the remote location whenever a vehicle wheel passes the preselected wayside point along the track.

As shown in FIG. 2, the rectifying network comprises a first diode D1 which provides a continuous rectified DC voltage to the detection unit 1 and a second diode D2 which is selectively rendered conductive to permit the production of an output signal signifying the presence and passage of a vehicle wheel, as will be described in detail hereinafter. As shown, the lower terminal of the secondary winding 10 is connected to the cathode of diode D1 while its anode is connected to the cathode wire 3b of conductor 3. The upper terminal of secondary winding 10 is directly connected to the common wire 3a of conductor 3. A resistor R1 and the diode D2 are connected in series and, in turn, are connected across the diode D1. It will be noted that the diodes D1 and D2 are connected in reverse relationship with each other. The utilization device 7 is connected across the resistor R1, so that when a sufficient voltage is developed across the resistor, the utilization device will become energized, as will be described hereinafter. A lightning arrester 11, such as, a Sarkes-Tarzian selenium suppressor or any other similar device, is preferably connected across one end of wires 3a and 3b to prevent high voltage transients or surges from adversely affecting the operation or possibly destroying the remotely located components. Further, a similar lightning arrester 12 is connected across the other end of cable 3 to protect the wayside detection device against high voltage transients which may be produced by lightning.

As previously mentioned, the diode D1 conducts continuously to provide the necessary operating potential to the various components of the wayside detection unit 1 while the current flowing through the diode D2 is controlled in accordance with the presence and absence of a vehicle wheel in the vicinity of the detection unit so that the voltage developed across resistor R1 is controlled in accordance therewith. As shown, a circuit path is established from the upper terminal of the secondary winding 10, over conductor 3a, through a smoothing capacitor C1, through current limiting resistor R2, through diode D3 in its forward low impedance direction, over conductor 3b, through diode D1, in its forward low impedance direction, to the lower terminal of the secondary winding 10. As a result, half-wave rectified and smooth operating voltage substantially equal to the RMS value of the voltage induced in secondary winding 10 appears across DC terminals A and B. A higher operating potential level appears on DC terminal C by employing a voltage doubling network consisting of diodes D4 and D5 and capacitors C2 and C3. Accordingly, the voltage doubling network provides the necessary level of DC operating potential for the last stage of the amplifying circuit. That is, the upper terminal of the secondary winding 10 is connected by wire 3a to the anode of diode D4 while its cathode is connected to the junction of capacitor C2 and resistor R3. The other side of the capacitor C2 is connected to the junction of resistor R4 and the anode of diode D5. The cathode of diode D5 is connected to the wire 3b and through the forward low impedance direction of diode D1 to the lower terminal of the secondary winding 10. Capacitor C3 is connected between the terminal C and the common wire 3c. As a result, a potential level on terminal C is substantially twice the voltage value of that appearing on terminal A. In actual practice with a 10 volt RMS value of voltage induced in the secondary winding 10, a positive 8.4 volts will appear on terminal A while an approximately 14.5 volts will appear at point C which is sufficient operating and biasing potentials for satisfying the operating conditions of the oscillating, the amplifying and the switching circuits.

Turning now to the details of the wayside detection unit, it will be noted that NPN transistor Q1 and its associated components form an oscillating circuit. The oscillating circuit may be of any conventional type which is capable of generating high frequency or RF signals. The frequency of oscillations is determined by the LC time constants of a pair of tuned resonant circuits comprising the inductances L1 and L2 and capacitances C4 and C5. The inductors L1 and L2 are preferably wound on a U-shaped core (not shown) of magnetic material, such as ferrite, which is appropriately positioned within the encapsulated housing of the detection unit to be influenced by the passage of the metallic vehicle wheels. As shown, the emitter electrode of transistor Q1 is directly connected to the line which is common to terminal B. The resonant tank circuit comprising inductor L1 and capacitor C4 has one end directly connected to the emitter electrode of transistor Q1 and has its other end connected to the base electrode of transistor Q1 by coupling capacitor C6. The base electrode of transistor Q1 is also connected to the common wire 3a by resistor R5. The parallel resonant circuit comprising inductor L2 and capacitor C4 has one end connector electrode of transistor Q1 while the other end is connected through the resistor R6 to the common wire 3a. Without attempting to limit the scope of the present invention, the frequency determining elements of the transistor oscillator are chosen to produce a signal having the frequency of 130 kilohertz since this particular signal frequency is furthest removed from the various cab signal and train phone frequencies normally present in a railroad environment.

As shown, the output from the oscillating circuit is applied to the input of the first stage of the two-stage amplifier comprising NPN transistors Q2 and Q3. That is, the base electrode of transistor Q2 is directly connected to the upper end of the parallel resonant circuit comprising inductor L1 and capacitor C4. The collector electrode of transistor Q2 is connected to the common wire 3a by resistor R7 while the emitter electrode of transistor Q2 is connected to the terminal B by resistor R8. The transistor Q2 takes the form of a common-collector or emitter-follower amplifier for impedance matching purposes. The emitter electrode of transistor Q2 is connected to an RC coupling circuit comprising capacitor C7 and resistor R9 having a relatively long time constant, namely, approximately 7 seconds. Accordingly, the output from the emitter electrode of transistor Q2 is applied to the base electrode of the second stage transistor Q3 through the RC coupling network. The emitter electrode of transistor Q3 is directly connected to the terminal B while the collector electrode of transistor Q3 is coupled through a pair of series connected resistors R10 and R11 to the DC terminal C which, as previously mentioned, is substantially twice the voltage level as that appearing on common conductor 3a. The NPN transistor Q3 takes the form of the class C amplifier stage and, therefore, is very sensitive to minute changes in signal level.

As shown, the output of the class C amplifier is applied to the firing circuit of the silicon controlled rectifier SCR. That is, the junction point J1 of the series connected resistors R10 and R11 is directly connected to the gate electrode of the silicon controlled rectifier SCR. A double anode Zener diode Z1 is connected between the gate electrode and the cathode of the silicon controlled rectifier to protect the silicon controlled rectifier against excessive voltage of either polarity which may have a tendency to destroy it. In addition, a bypass capacitor C8 is also connected between the gate and the cathode electrode of the silicon controlled rectifier SCR. As shown, the cathode electrode of the silicon controlled rectifier SCR is directly connected to the common wire 3a while the anode electrode of the silicon controlled rectifier SCR is connected by a current-limiting resistor R12 and diode D6 to the wire 3b. It will be noted that the silicon controlled rectifier, the diode D6, and the diode D3 are each poled in the same direction, the purpose of which will be described in greater detail hereinafter.

In describing the operation, let us assume that the proximity detector is operating properly and that there is no vehicle wheel in the vicinity of the detection unit 1. Under this condition, with the appropriate operating and biasing potentials supplied to the wayside detection unit 1 over the two-wire conductor 3, the oscillator is in the state of oscillation and producing a signal of a given amplitude and a frequency determined by the LC time constants of the resonant tank circuits. The signal produced by the oscillator is fed to the input of the first emitter-follower amplifier stage and, in turn, is applied to the input of the second class C amplifier stage which is rendered conductive. Under this condition, the silicon controlled rectifier SCR is held nonconductive so that no current flows through the output supply circuit with the result that no voltage is developed across resistor R1, and accordingly, the utilization device 7 remains deenergized. That is, the conduction of the output amplifier stage, namely, transistor Q3 of the class C amplifier, holds the potential level at the junction point J1 of resistors R10 and R11 and, in turn, on the gate electrode of the silicon controlled rectifier SCR less positive than the voltage of the cathode electrode of the silicon controlled rectifier SCR thereby preventing conduction of the silicon controlled rectifier at this time. It will be noted that since the efficiency of class C amplifiers is relatively high, the use of such an amplifier materially reduces the amount of wasted power so that the overall operation of the entire proximity detector is improved.

Let us now assume that the vehicle wheel W has entered the proximity of the detection unit 1 so that an operational change occurs. The presence of a magnetic vehicle wheel causes the inductance values of inductors L1 and L2 of the respective tank circuits to decrease, causes the circuit losses to increase due to additional eddy current losses in the wheel, and also results in the coefficient of coupling between inductors L1 and L2 to decrease so that the voltage amplitude of the oscillating circuit is proportionally decreased. Accordingly, the input signal applied to the first stage and appearing on the emitter transistor Q2 is insufficient to overcome the negative biasing potential on the base electrode of transistor Q3. Therefore, transistor Q3 becomes effectively cutoff and the junction point J1 of resistors R10 and R11 rises to a sufficient level to positively bias the gate electrode of the silicon controlled rectifier SCR so that it is rendered conductive when the proper voltage polarity appears on its anode. That is, during each alternate half-cycle when the anode of the silicon controlled rectifier SCR is positive with respect to its cathode, the silicon controlled rectifier conducts and establishes a circuit path from the lower terminal of secondary winding 10 through resistor R1, diode D2, diode D6, resistor R12, the anode and cathode of the silicon controlled rectifier SCR to the upper terminal of secondary winding 10. Accordingly, alternate halfcycles of the AC supply voltage are rectified and a pulsating voltage is developed across resistor R1 for energizing the utilization device 7, thereby providing an output signal which is indicative of a vehicle wheel in the vicinity of the detection unit 1. If the vehicle wheel moves away from the wayside detection unit 1 within a 7 second period, the oscillator circuit will immediately resume its normal operation and produce a sufficient voltage signal to cause the transistor Q3 to again assume its normal class C operation. The operation of transistor Q3 causes the potential level at the junction point J1 of resistors R10 and R11 to drop so that the gate electrode of silicon controlled rectifier SCR is no longer positive with respect to its cathode and, therefore, the silicon controlled rectifier SCR is incapable of being rendered conductive on respective half-cycles. Accordingly, the energization of the utilization device 7 signifies the passage of the vehicle wheel.

It will be noted that if a vehicle wheel remains within the vicinity of the wayside detection unit 1 longer than a 7 second period, which obviously may be varied in accordance with the desired needs and conditions of each application, the silicon controlled rectifier SCR will be rendered nonconductive and the utilization device 7 will become deenergized. That is, if the vehicle wheel passes very slowly by the detection unit 1 or stops in the vicinity thereof, the charge on capacitor C7 will be dissipated through the leakage resistor R9 to read just the biasing on transistor Q3 so that it will begin functioning as a class C amplifier even at the low amplitude of signals produced by the oscillating circuit at this time. It is quite apparent that the resumption of operations of the transistor Q3 causes the junction point J1 of resistors R10 and R11 and, in turn, the gate electrode of silicon controlled rectifier SCR to be reduced to a point where the required positive gating potential is no longer present for firing the silicon controlled rectifier SCR. Accordingly, after the 7 second period, no output signal appears across resistor R1 due to the inability of the silicon controlled rectifier SCR to conduct and, accordingly, the utilization device 7 becomes deenergized. After the vehicle wheel departs from the vicinity of the wayside detection unit 1, the oscillator circuit again immediately returns to its normal operating frequency and the increased amplitude of the oscillator causes the capacitor C7 to quickly charge through the base and emitter electrodes of transistor Q3 so that normal biasing conditions are again resumed. This resumption of normal operation has no effect on the silicon controlled rectifier SCR since the potential level at the junction of resistors R10 and R11 does not undergo any substantial voltage change. Accordingly, the detection unit is only responsive to the initial entry of a train wheel in the vicinity thereof, and the stopping and the subsequent departure of a train wheel has no effect so that only a single output signal per vehicle wheel is possible. The slow discharge of capacitor C7 through the resistors R8 and and R9 provides a relatively long time for indicating the passage of slowly moving wheels while the fast recharging of capacitor C7 through the base-emitter electrodes of transistor Q3 provides a rapid recovery for readily detecting the passage of fast moving vehicle wheels.

It has been found that with the exception of a normal periodic inspection to insure that the detection unit has not been damaged by dragging equipment, there is very little maintenance required for the presently described proximity detector.

Further, while the proximity detector has been described in relation to switching and distance-to-go operations, it is readily understood that the present detector may be used in other applications, such as, check-in checkout operations, automatic car identification applications, car dumping installations and various other railroading applications. But regardless of the manner in which the invention is used, it is understood that various alterations may be made by persons skilled in the art without departing from the spirit and scope of this invention. It will also be apparent, that other modifications and changes can be made to the presently described invention, and, therefore, it is understood that all changes, equivalents, and modifications within the spirit and scope of the present invention are herein meant to be included in the appended claims.

I claim:

1. A detector for indicating the passage of an object moving along a given path comprising, first means having a solid-state detection unit positioned at a preselected point along the given path for detecting the passage of the object, second means remotely located from said preselected point having a source of voltage and a utilization device, and third means electrically coupled from said second means to said first means for providing operating potential from said voltage source to said first means and controllingly coupled by said first means for supplying output power from said voltage source to said utilization device whenever the first means detects an object passing preselected point.

2. A detector as defined in claim 1, wherein said detection unit includes an oscillating circuit having a tuned resonant circuit which is responsive to the passage of the object.

3. A detector as defined in claim 2, wherein said detection unit includes a switching circuit having a semiconductive device which is controlled by the electrical condition of said oscillating circuit.

4. A detector as defined in claim 3, wherein said detection unit includes an amplifying circuit for electrically interconnecting said oscillating circuit to said switching circuit.

5. A detector as defined in claim 3, wherein said semiconductive device comprises a silicon controlled rectifier.

6. A detector as defined in claim 1, wherein said third means comprises an interface circuit including a rectifier network.

7. A detector as defined in claim 6, wherein said rectifier network includes a first diode rectifier for providing operating potential to said first means and a second diode rectifier for supplying output power to said second means whenever the object passes said preselected point.

8. A detector for indicating the passage of an object moving along a given path comprising, first means positioned at a preselected point along the given path for detecting the passage of the object, second means remotely located from said preselected point having a source of voltage and a utilization device, and third means including a two-wire conductor electrically coupled from said second means to said first means for providing operating potential from said voltage source to said first means and controllingly coupled by said first means for supplying output power from said voltage source to said utilization device whenever the first means detects an object passing said preselected point.

9. A proximity detector for detecting the presence of a vehicle wheel traversing a track rail comprising, a rail-mounted unit having cascaded stages formed of an oscillating, an amplifying and a switching circuit, a remotely located unit having a source of power and a utilization device, and an interface circuit having a rectifier network and electrical conducting means for electrically interconnecting said rail-mounted unit to said remotely located unit wherein supply potential is constantly provided for said oscillating, amplifying and switching circuits from said source of power and output power is provided for said utilization device from said source of power only during the presence of a vehicle wheel.

10. A proximity detector as defined in claim 9, wherein said oscillating circuit includes a frequency determining circuit which is detuned by the presence of a vehicle wheel.

11. A proximity detector as defined in claim 10, wherein said switching circuit includes a silicon controlled rectifier which is rendered conductive by the detuning of said oscillating circuit.

12. A proximity detector as defined in claim 11, wherein said interface circuit includes a circuit path having a series-connected resistor and diode which effectively energizes said utilization device when said silicon controlled rectifier is rendered conductive.

13. A proximity detector as defined in claim 9, wherein said electrical conducting means comprises a two-wire conductor.